United States Patent
Hyde et al.

(10) Patent No.: US 11,880,370 B2
(45) Date of Patent: *Jan. 23, 2024

(54) RETROREFLECTIVE JOIN GRAPH GENERATION FOR RELATIONAL DATABASE QUERIES

(71) Applicant: Google LLC, Mountain View, CA (US)

(72) Inventors: Julian Hyde, Santa Cruz, CA (US); Jonathan Swenson, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/651,529

(22) Filed: Feb. 17, 2022

(65) Prior Publication Data

US 2022/0171775 A1    Jun. 2, 2022

Related U.S. Application Data

(63) Continuation of application No. 16/417,630, filed on May 20, 2019, now Pat. No. 11,281,671.

(51) Int. Cl.
*G06F 16/24* (2019.01)
*G06F 16/2455* (2019.01)
*G06F 7/14* (2006.01)
*G06F 16/901* (2019.01)

(52) U.S. Cl.
CPC ............ *G06F 16/2456* (2019.01); *G06F 7/14* (2013.01); *G06F 16/9024* (2019.01)

(58) Field of Classification Search
CPC .... G06F 16/2456; G06F 7/14; G06F 16/9024; G06F 16/212

USPC ......................................................... 707/714
See application file for complete search history.

(56) References Cited

U.S. PATENT DOCUMENTS

| | | | |
|---|---|---|---|
| 6,477,525 B1 | 11/2002 | Bello | |
| 6,480,836 B1 | 11/2002 | Colby et al. | |
| 7,853,603 B2 | 12/2010 | Churin et al. | |
| 11,500,931 B1 * | 11/2022 | Parchas | G06F 16/9024 |
| 2006/0161566 A1 | 7/2006 | Dobra et al. | |
| 2008/0052266 A1 * | 2/2008 | Goldstein | G06F 16/24549 |
| 2009/0019001 A1 | 1/2009 | Thiyagarajan et al. | |
| 2010/0131490 A1 * | 5/2010 | Lamb | G06F 16/24542 707/719 |

(Continued)

OTHER PUBLICATIONS

Julian Hyde, Website: https://www.slideshare.net/julianhyde/dont-optimize-my-queries-organize-my-data, Sep. 26, 2018, 12 pages.

(Continued)

*Primary Examiner* — Hicham Skhoun
(74) *Attorney, Agent, or Firm* — Honigman LLP; Brett A. Krueger

(57) ABSTRACT

A method, system and computer program product for join graph generation based upon a log of previously executed database queries includes method for generating a join graph for relational database queries. The method includes loading into memory of a computer, a log of a set of database queries previously executed against data in a database and sequentially parsing each of the queries in the log to identify different semantically characterizable components of each of the queries. The method further includes generating a join graph for each of the queries from corresponding ones of the components. Finally, the method includes selectively adding each of the generated join graphs to a set of join graphs in a data model for the data in the database.

20 Claims, 2 Drawing Sheets

(56) References Cited

U.S. PATENT DOCUMENTS

| | | | |
|---|---|---|---|
| 2011/0246448 A1* | 10/2011 | Tatemura | G06F 16/24526 707/718 |
| 2012/0079454 A1* | 3/2012 | Kwan | G06F 8/75 717/120 |
| 2012/0290559 A1* | 11/2012 | Fuller | G06F 16/2456 707/E17.054 |
| 2014/0046928 A1 | 2/2014 | Konik | |
| 2014/0101132 A1* | 4/2014 | Konik | G06F 16/242 707/718 |
| 2014/0108321 A1* | 4/2014 | Buchanan | G06N 5/02 706/50 |
| 2016/0055205 A1* | 2/2016 | Jonathan | G06F 16/2456 707/714 |
| 2016/0103931 A1* | 4/2016 | Appavu | G06F 16/24522 707/760 |
| 2016/0110418 A1 | 4/2016 | Dixit et al. | |
| 2017/0185655 A1* | 6/2017 | Jahankhani | G06F 16/951 |
| 2019/0005094 A1* | 1/2019 | Yi | G06F 16/2282 |
| 2019/0026337 A1 | 1/2019 | Aksman | |
| 2019/0236085 A1 | 8/2019 | Galitsky | |
| 2019/0384846 A1* | 12/2019 | Mathur | G06F 16/24524 |
| 2020/0394201 A1 | 12/2020 | Li et al. | |
| 2021/0209098 A1* | 7/2021 | Shi | G06F 16/2448 |

OTHER PUBLICATIONS

Julian Hyde, Website: https://issues.apache.org/jira/browse/CALCITE-1870, Jul. 5, 2017, 2 pages.

Julian Hyde, Website: https://calcite.apache.org/docs/history.html#v1-18-0, Oct. 19, 2021, 193 pages.

* cited by examiner

RETROREFLECTIVE JOIN GRAPH GENERATION FOR RELATIONAL DATABASE QUERIES

CROSS REFERENCE TO RELATED APPLICATIONS

This U.S. patent application is a continuation of, and claims priority under 35 U.S.C. § 120 from, U.S. patent application Ser. No. 16/417,630, filed on May 20, 2019. The disclosure of this prior application is considered part of the disclosure of this application and is hereby incorporated by reference in its entirety.

TECHNICAL FIELD

The present disclosure relates to the field of database management and more particularly to the generation of a join graph for relational database queries.

BACKGROUND

The term database refers to an organized collection of data, stored and accessed electronically by way of a computing system. A database management system (DBMS) in turn is a computer program that provides an interface between the database and one or more end users so as to facilitate the interaction by each end user with the database. A DBMS generally also provides an interface to other computer programs to access the data in the underlying database. Generally, speaking, end users and other computer programs interact with the database through the DBMS using query directives formed in conformance with a corresponding query language such as the venerable structured query language (SQL).

While the very basic use of SQL to query and manage data in a database is of no great difficulty for many end users, formulating more complex SQL queries is not for the faint of heart. More importantly, specifying a query irrespective of the mechanics of the actual query requires a strong understanding of the data in the database and the underlying relationships between the data. To the extent that "reading" the content of a database is not practical, it is known to model a database so that the created database model can then be introspected so as to afford a deeper understanding of the data in the database. Indeed, modern data analytics tools permit not only the modeling of an existing database, but also the formulation of SQL queries to be executed against the database based upon knowledge only supplied by the model.

In this regard, a data model is an abstract model that describes how a data set of a database is organized, and guides the construction of queries with respect to the data of the data set. The data model generally contains a join graph whose vertices each reference a table and whose edges reflect join conditions between references to the tables. As well, the join graph may also describe the columns in those tables, columns that are derived from other columns via expressions, collections of columns by which queries are typically sorted, collections of columns by which queries are typically grouped into sub-totals and totals, expressions that are derived by combining column values during the construction of a sub-total or total, and other suggestions for how queries might be formed on the data.

Despite the robust nature of a data model, the introspection of a data model for a database, however, is not alone sufficient to enjoy a complete understanding of the data in a database. In fact, automated database modeling tools generally only are able to produce a database model explicitly mapping to the underlying database including queries previously defined in the model as previously executed against the database through the DBMS for the database. But, so much implicit information remains undiscovered that otherwise might be inferred from the existing data in the database, but which has not yet been explicitly defined.

SUMMARY

Embodiments of the present disclosure address deficiencies of the art in respect to data model generation for a database and provide a novel and non-obvious method, system and computer program product for join graph generation for inclusion in the data model based upon a log of previously executed database queries. In an embodiment of the disclosure, a method for generating a join graph for relational database queries includes loading into memory of a computer, a log of a set of database queries previously executed against data in a database of the database management system and sequentially parsing each of the queries in the log to identify different semantically characterizable components of each of the queries. The method further includes generating a join graph for each of the queries from corresponding ones of the components. Finally, the method includes selectively adding each of the generated join graphs to a set of join graphs in a data model for the data in the database.

In one aspect of the embodiment, the each of the generated join graphs is added to the set of join graphs only when a comparable join graph is not already present in the set of join graphs, but otherwise on condition that one of the generated join graphs is found to be comparable to an existing join graph in the set, a merged form of the one of the generated join graphs and the existing join graph is added to the set in lieu of the one of the generated join graphs. In another aspect of the embodiment, each generated join graph is created by comparing the components of a corresponding one of the queries to components of a pre-stored query in a data store of queries correlating queries to corresponding table relationships, identifying a matching pre-stored query in the data store, and creating the generated join graph as a join of the corresponding table relationships of the matched pre-stored query. In yet another aspect of the embodiment, a join graph is generated for a corresponding one of the queries only when the corresponding one of the queries appears in the log more frequently than a minimum threshold frequency.

In even yet another aspect of the embodiment, the method further includes identifying at least two components in the query referencing corresponding columns of the database that are pre-determined to be combinable into a single unique column of the database and generating an object in the data model for the single unique column. In a final aspect of the embodiment, the method further includes identifying a column repeatedly referenced in the queries as pertaining to a measurement and generating an object in the data model reflecting a mathematical operation performed upon values of the identified column.

In another embodiment of the disclosure, a data analytics data processing system is configured for generating a join graph for relational database queries. The system includes a host computing system that has one or more computers, each with memory and at least one processor, and that is coupled to a database managed by a database management system. The system also includes a join graph generation module executing in the memory of the host computing system. The module includes computer program instructions enabled upon execution in the memory of the host computing system to establish a database connection to the database and load into memory a log of a set of database queries previously executed against data in the database by the database management system. The program instructions further are enabled to sequentially parse each query amongst the queries in the set of the log to identify different semantically characterizable components of the query and to select, in a data model of the data, a pre-existing join graph from amongst a set of pre-existing join graphs incorporating the components of the query. Finally, the program instructions are enabled to prompt in a user interface of the database management system to add the selected pre-existing join graph to the data model and to add the selected pre-existing join graph to the data model.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION OF DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

DETAILED DESCRIPTION

Embodiments of the disclosure provide for the generation of a join graph for relational database queries. In accordance with an embodiment of the disclosure, a log of past queries issued against a database is loaded into memory of a computer. Thereafter, each query is sequentially parsed in order to identify different semantically characterizable components of the query. For each of the queries, a join graph then is generated from corresponding ones of the components. Finally, for each join graph generated from corresponding components of a parsed query, the generated join graphs can be selectively added to a set of join graphs in a data model for the data in the database.

Figure 1:
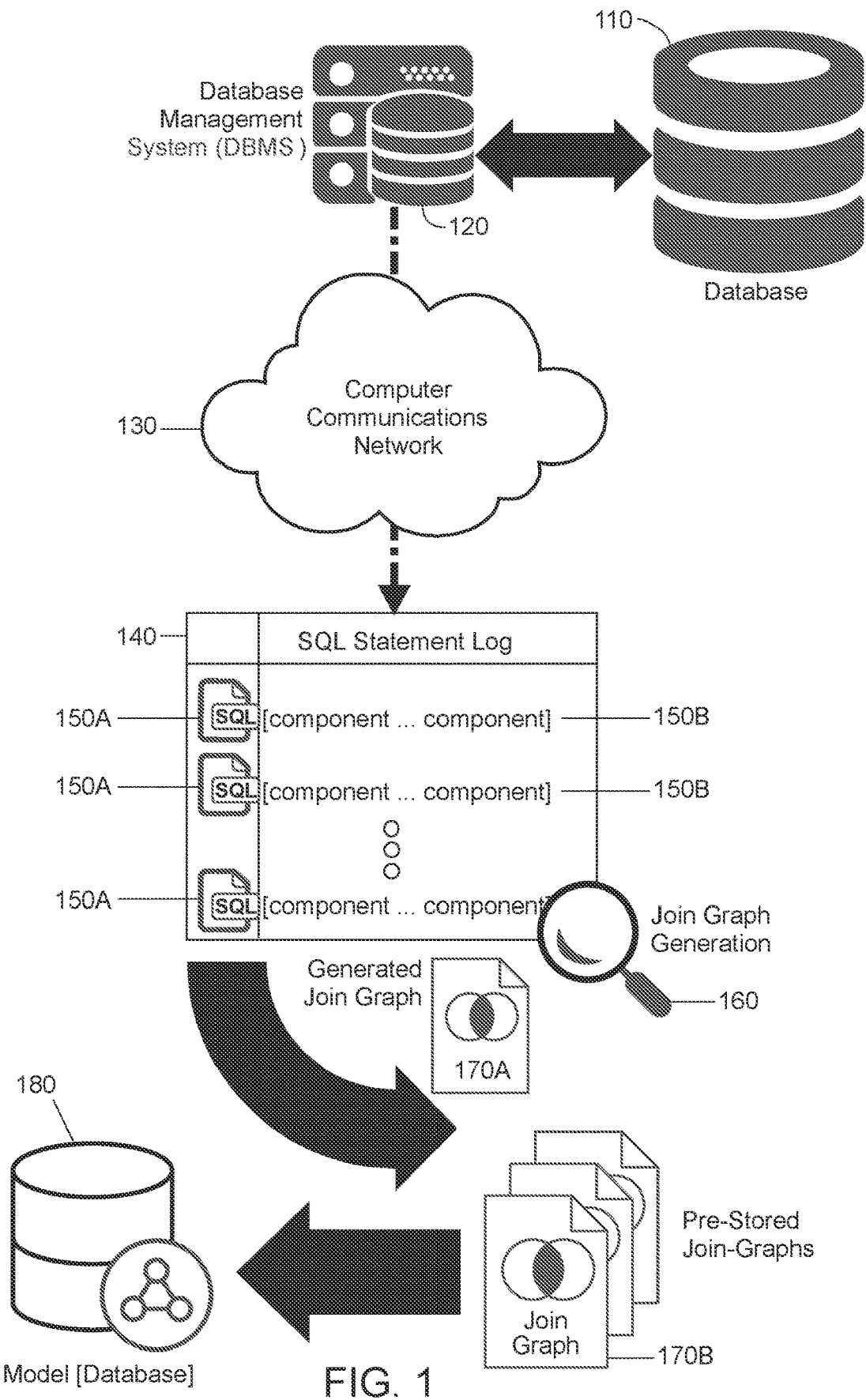
FIG. 1 is pictorial illustration of a process for generating a join graph for relational database queries.

In further illustration, FIG. 1 pictorially shows a process for generating a join graph for relational database queries. As shown in FIG. 1, a DBMS 120 manages interactions with data in a database 110 from over a computer communications network 130. Join graph generation logic 160 extracts from the DBMS 120 from over the computer communications network 130, a log of SQL statements 140, each of the SQL statements in the log 140 including an SQL directive 150A often referred to as a "verb" and one or more components 150B acted upon by the SQL directive 150A—namely one or more named entities.

Thereafter, the join graph generation logic 160 processes each of the SQL statements in the log 140 in order to generate a join graph 170A from the components 150B. Once the join graph 170A has been generated, the generated join graph 170A is compared to zero or more pre-existing join graphs 170B in a data model 180 for the data in the database 110. The generated join graph 170A is deemed comparable to one of the pre-stored join graphs 170B, for instance, when a threshold number of nodes and connectors of the both join graphs 170A, 170B are identical. To the extent that the generated join graph 170A is not comparable to any of the pre-existing join graphs 170B, the generated join graph 170A is added to the data model 180 for the data of the database 110.

Optionally, the join graph generation logic 160 can additionally process each SQL statement in the log 140 to identify at least two components 150B referencing corresponding columns of the database 110 that are pre-determined to be combinable into a single unique column of the database 110 so as to cause the join graph generation logic 160 to generate an object in the data model 180 for the single unique column. As another option, the join graph generation logic 160 may identify a column repeatedly referenced in each of the SQL queries of the log 140 as pertaining to a measurement so as to generate an object in the data model 180 reflecting a mathematical operation performed upon values of the identified column.

Figure 2:
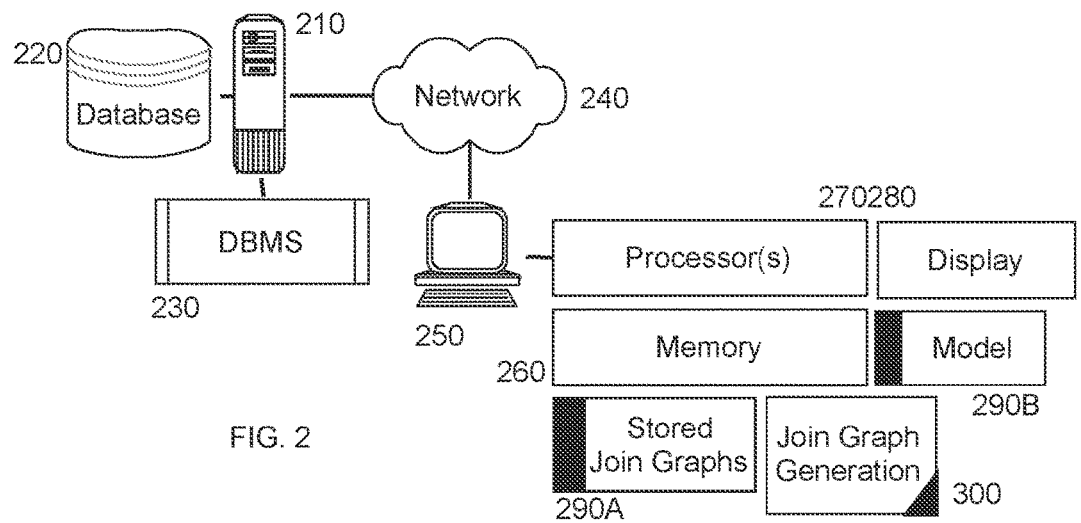
FIG. 2 is a schematic illustration of a database management system configured for generating a join graph for relational database queries.

The process described in connection with FIG. 1 may be implemented in a data analytics data processing system. In further illustration, FIG. 2 schematically shows a database management system configured for generating a join graph for relational database queries. The system includes a host computing system 250 that includes one or more processors 270, memory 260 and a display 280. The host computing system 250 is coupled to a remote database server 210 supporting the execution of a DBMS 230 managing interactions with a database 220. The system also includes a join graph generation module 300 including computer program instructions that execute in the memory 260 of the host computing system 250.

The program instructions of the join graph generation module 300 upon execution in the memory 260 of the host computing system are operable to establish a connection with the DBMS 230 and to retrieve a log of SQL statements issued against the database 220, each of the SQL statements including one or more data components in the database 220 upon which a SQL directive acts. The program code of the join graph generation module 300 also is operable during execution to process each SQL statement in the log by creating a join graph for the components of the SQL statement and comparing the created join graph to a set of pre-stored join graphs 290A of a data model 290B of the data in the database 220 in the memory 260. The program code of the join graph generation module 300 yet further is operable to add the created join graph to the model 290B in the memory 260 of the database 220 when the created join graph is not found to be similar to join graphs already present in the model 290B.

Figure 3:
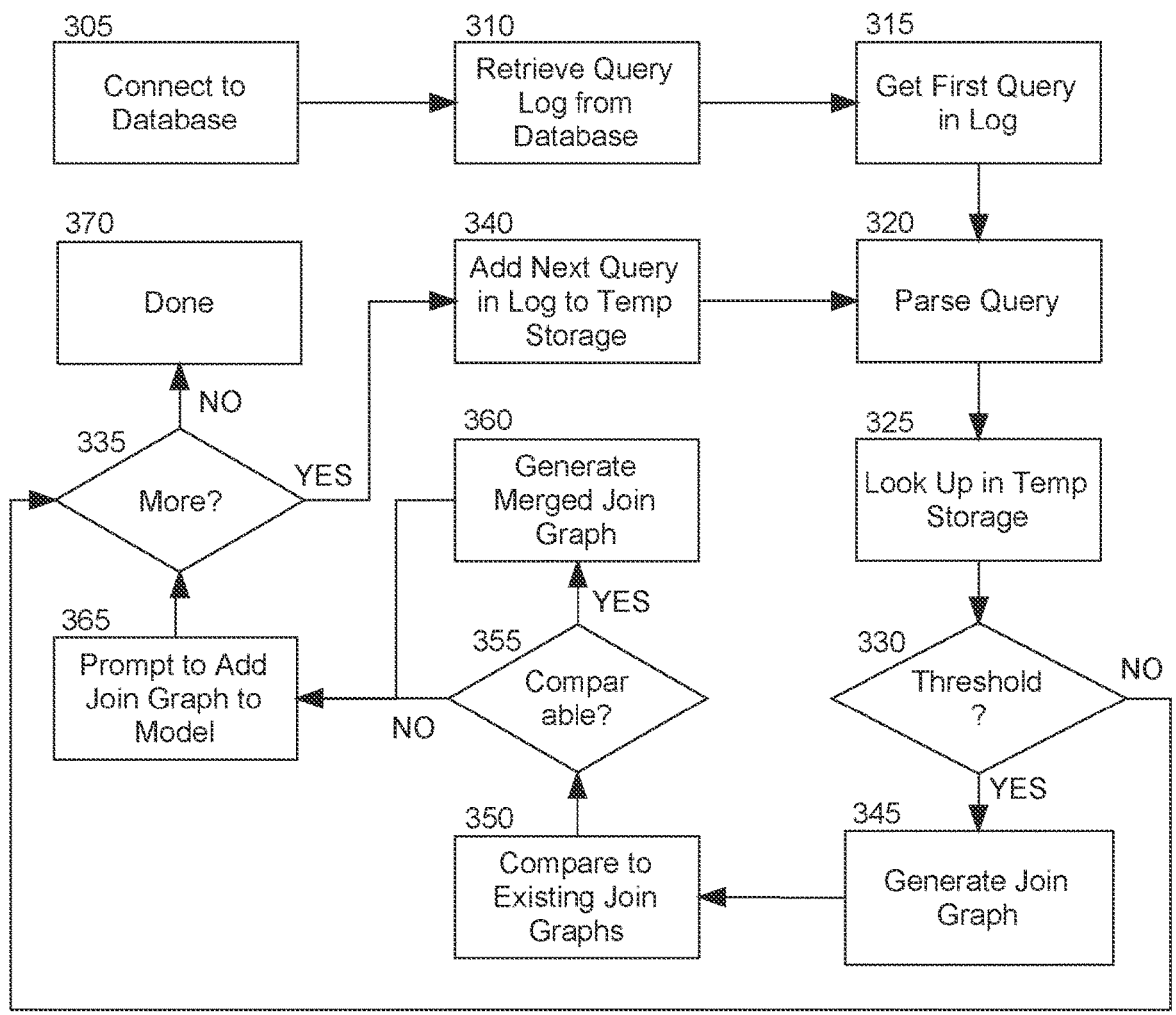
FIG. 3 is a flow chart illustrating a process for generating a join graph for relational database queries.

In even further illustration of the operation of the join graph generation module 300, FIG. 3 is a flow chart illustrating a process for generating a join graph for relational database queries. Beginning in block 305, a connection is established with the remotely disposed database. In block 310, a query log is retrieved from a DBMS managing interactions with the database. Then, in block 315, a first query in the log is selected for processing. To that end, the query is then parsed to remove therefrom one or more components upon which a SQL directive is specified to act within the query and to construct an abstract syntax tree (AST) for the query. In block 325, the AST is located in temporary storage.

In decision block 330, if the AST has appeared previously in the temporary storage for a threshold number of times, in block 345 a join graph is generated for the AST and compared in block 350 to a set of pre-stored join graphs disposed within a data model for data in the database by comparing the nodes and connectors of the generated join graph to those of each of the pre-stored join graphs in order to determine a threshold degree of similarity or in fact complete similarity. In decision block 355, if the generated join graph is found not to be similar to one of the pre-stored join graphs, for instance, by virtue of the generated join graph failing to contain similar tables joined via similar relationships, then in block 365, a prompt is displayed to add the generated join graph to the model for the database. But otherwise, if the generated join graph is found to be similar to one of the pre-stored join graphs, then in block 360 the generated join graph is merged with the similar one of the pre-stored join graphs to form a merged join graph and in block 365, a prompt is displayed to add the merged join graph to the model for the database.

In either circumstance, in decision block 335, if additional SQL statements remained to be processed in the log, the process repeats in block 340 with the retrieval of a next SQL statement in the log. In decision block 355, when no more SQL statements remain to be processed in the log, in block 365 the process ends.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims as follows:

1. A computer-implemented method when executed by data processing hardware causes the data processing hardware to perform operations comprising
    obtaining a query previously executed against data in a database of a database management system;
    obtaining a database model modelling the database, the database model comprising a set of join graphs;
    identifying, in the query, one or more data components;
    generating, using the one or more data components, a new join graph;
    for each respective join graph in the set of join graphs, determining whether the new join graph satisfies a threshold similarity with the respective join graph; and
    when the new join graph satisfies the threshold similarity with each respective join graph of the set of join graphs, adding the new join graph to the set of join graphs.

2. The method of claim 1, wherein the operations further comprise:
    when the new join graph fails to satisfy the threshold similarity with a particular respective join graph of the set of join graphs, merging, the new join graph and the particular respective join graph into a merged join graph; and
    adding the merged join graph to the set of join graphs.

3. The method of claim 1, wherein determining whether the new join graph satisfies the threshold similarity with the respective join graph comprises comparing a first threshold number of nodes of the new join graph to a second threshold number of nodes of the respective join graph.

4. The method of claim 3, wherein determining whether the new join graph satisfies the threshold similarity with the respective join graph further comprises identifying that the first threshold number of nodes of the new join graph is identical to the second threshold number of nodes of the respective join graph.

5. The method of claim 1, wherein determining whether the new join graph satisfies the threshold similarity comprises comparing a first threshold number of connectors of the new join graph to a second threshold number of connectors of the respective join graph.

6. The method of claim 1, wherein:
    the one or more data components, in the query, are acted upon by a Structured Query Language (SQL) directive; and
    the operations further comprise constructing, for the query, an abstract syntax tree.

7. The method of claim 6, wherein generating the new join graph comprises:
    storing the abstract syntax tree in a temporary storage; and
    determining that a number of times the abstract syntax tree has appeared in the temporary storage satisfies a threshold number of times.

8. The method of claim 1, wherein identifying, in the query, the one or more data components comprises:
    combining the one or more data components into a single unique column of the database; and
    generating an object in the database model for the single unique column of the database.

9. The method of claim 1, wherein the new join graph satisfies the threshold similarity with the respective join graph when the new join graph is less than the threshold similarity with the respective join graph.

10. The method of claim 1, wherein:
    a log of the database includes the query; and
    generating the new join graph comprises determining that a number of times the query appears in the log of the database satisfies a minimum threshold frequency.

11. A system comprising:
    data processing hardware; and
    memory hardware in communication with the data processing hardware, the memory hardware storing instructions that when executed on the data processing hardware cause the data processing hardware to perform operations comprising:
        obtaining a query previously executed against data in a database of a database management system;
        obtaining a database model modelling the database, the database model comprising a set of join graphs,
        identifying, in the query, one or more data components;
        generating, using the one or more data components, a new join graph;
        for each respective join graph in the set of join graphs, determining whether the new join graph satisfies a threshold similarity with the respective join graph; and
        when the new join graph satisfies the threshold similarity with each respective join graph of the set of join graphs, adding the new join graph to the set of join graphs.

12. The system of claim 11, wherein the operations further comprise:
    when the new join graph fails to satisfy the threshold similarity with a particular respective join graph of the set of join graphs, merging, the new join graph and the particular respective join graph into a merged join graph; and
    adding the merged join graph to the set of join graphs.

13. The system of claim 11, wherein determining whether the new join graph satisfies the threshold similarity with the respective join graph comprises comparing a first threshold number of nodes of the new join graph to a second threshold number of nodes of the respective join graph.

14. The system of claim 13, wherein determining whether the new join graph satisfies the threshold similarity with the respective join graph further comprises identifying that the first threshold number of nodes of the new join graph are identical to the second threshold number of nodes of the respective join graph.

15. The system of claim 11, wherein determining whether the new join graph satisfies the threshold similarity comprises comparing a first threshold number of connectors of the new join graph to a second threshold number of connectors of the respective join graph.

16. The system of claim 11, wherein:
    the one or more data components, in the query, are acted upon by a Structured Query Language (SQL) directive; and
    the operations further comprise constructing, for the query, an abstract syntax tree.

17. The system of claim 16, wherein generating the new join graph comprises:
    storing the abstract syntax tree in a temporary storage; and
    determining that a number of times the abstract syntax tree has appeared in the temporary storage satisfies a threshold number of times.

18. The system of claim 11, wherein identifying, in the query, the one or more data components comprises:
   combining the one or more data components into a single unique column of the database; and
   generating an object in the database model for the single unique column of the database.

19. The system of claim 11, wherein the new join graph satisfies the threshold similarity with the respective join graph when the new join graph is less than the threshold similarity with the respective join graph.

20. The system of claim 11, wherein:
   a log of the database includes the query, and
   generating the new join graph comprises determining that a number of times the query appears in the log of the database satisfies a minimum threshold frequency.

* * * * *